United States Patent [19]

Marks

[11] Patent Number: 4,619,244
[45] Date of Patent: Oct. 28, 1986

[54] SOLAR HEATER WITH CAVITY AND PHASE-CHANGE MATERIAL

[76] Inventor: Alvin M. Marks, Bigelow Rd., Athol, Mass. 01331

[21] Appl. No.: 581,265

[22] Filed: Feb. 17, 1984

Related U.S. Application Data

[63] Continuation-in-part of Ser. No. 479,091, Mar. 25, 1983, abandoned.

[51] Int. Cl.$^4$ ............................................. F24J 2/02
[52] U.S. Cl. .................................. 126/451; 126/424; 126/430; 126/440
[58] Field of Search ............... 126/424, 427, 430, 437, 126/440, 441, 451; 252/70

[56] References Cited

U.S. PATENT DOCUMENTS

| | | | |
|---|---|---|---|
| 1,081,098 | 12/1913 | De La Garza | 126/424 |
| 1,658,455 | 2/1928 | Metzech et al. | 126/440 X |
| 2,552,237 | 5/1951 | Trombe | 126/440 |
| 2,876,634 | 3/1959 | Zimmerman et al. | 165/DIG. 4 |
| 2,920,710 | 1/1960 | Howard | 126/424 X |
| 3,029,596 | 4/1962 | Hanslo et al. | 126/451 X |
| 3,106,201 | 10/1963 | Steinberg | 126/451 |
| 3,305,686 | 2/1967 | Carter et al. | 126/425 X |
| 3,633,019 | 1/1972 | Suga | 126/424 X |
| 3,938,497 | 2/1976 | Andrassy | 126/451 |
| 3,956,153 | 5/1976 | Chadha | 252/70 X |
| 3,982,526 | 9/1976 | Barak | 126/425 |
| 4,018,212 | 4/1977 | Hein et al. | 126/451 |
| 4,139,286 | 2/1979 | Hein et al. | 126/440 X |
| 4,187,123 | 2/1980 | Diggs | 126/440 X |
| 4,378,790 | 4/1983 | Erwin | 126/424 X |
| 4,449,515 | 5/1984 | Nilsson, Sr. | 126/430 |
| 4,459,972 | 7/1984 | Moore | 126/424 |

FOREIGN PATENT DOCUMENTS 2458768  2/1981  France ........................ 126/424

*Primary Examiner*—Larry Jones

[57] ABSTRACT

A heating chamber is mounted on a first axis of rotation, and revolves through an angle $\Omega$ at a constant angular velocity. The first axis of rotation is adjustable through an angle $\theta$ to the horizontal according to the geographic latitude, and through an angle $\phi$ to the axis of rotation according to the season. The heating chamber is an insulated cavity with a small aperture. The sun's rays are focussed along a second axis normal to the first axis through a small aperture into the heating chamber. The heating chamber contains a phase change material which melts at about 180° C., which provides heat at that temperature after sundown. In one embodiment, a structure includes a platen to supply heat to a cooking utensil. The platen has heat-conducting ribs attached to its bottom side, which dip into the phase-change material contained in an enclosure under the platen. The surface of the platen is maintained level by gravity.

1 Claim, 2 Drawing Figures

SOLAR HEATER WITH CAVITY AND PHASE-CHANGE MATERIAL

This invention is a continuation in part of the patent application entitled Solar Cavity Cooker, Ser. No. 479,091 filed on Mar. 25, 1983, now abandoned.

BACKGROUND OF THE INVENTION

Reference is made to the parent patent application in which the prior art relating to solar cookers was summarized and illustrated. The present device is a further development of the solar cavity cooker disclosed in said prior patent application characterized by a sun-following solar cavity, which enables the light power of the sun to be efficiently utilized.

IN THE FIGURES

DESCRIPTION OF THE INVENTION

In the parent patent application FIG. 6 shows a Fresnel lens which is angularly adjustable to concentrate sun's energy into a stationary cavity as a heated enclosure; and FIG. 7 shows a similar device in which a Dewar flask cavity is tilted to focus the sun's rays into the aperture of the cavity.

In this invention an improved sun-following structure is employed, which solved a number of the outstanding problems with the earlier invention. There was the problem of isolating the cavity from the cooker chamber so the vapors from the heated food cannot deposit on to the lens surfaces, which would damage the lens surface and obscure the light focussed into the cavity. The present device also includes an efficient heat transfer means for transmitting the heat energy from the phase change material to the cooking platen on which the food is cooked.

Figure 1:
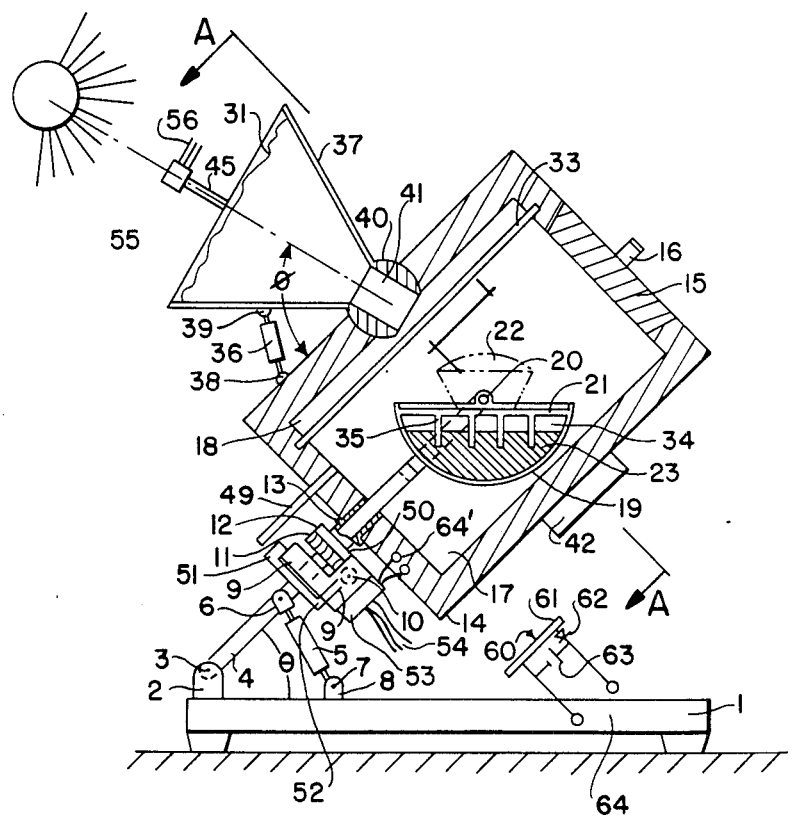
FIG. 1 shows a cross section of a rotatable heating chamber of this invention.

Referring to FIG. 1, a base 1 has a bracket 2 supporting a pivot pin 3 to which the tiltable axial member 4 is attached. The axial member 4 is adjustable at an angle $\theta$ to the horizontal, for example, by a turn buckle 5, which is secured to the base by the bracket 8, and to the axial member 4 by pins at 6 and 7 respectively A plate is mounted on axial member 4, and a clock motor 9' is mounted on the plate 9. The clock motor operates a worm 10, which meshes with worm gear 11. The worm gear 11 is secured to a sleeve 12, which rotates on the axial member 4, and which is also secured at 13 to the insulated chamber 14, which may be cylindrical. The chamber 14 has a insulated door 15, which may be opened with the handle 16. The door may be removable or on a hinge. Within the chamber 14 are two cavities 17 and 18. Cavity 17 contains the heating element 19 which is suspended from a pivot point 20, mounted on the member 4. The heating element 19 and the platen surface 21 rests in a horizontal position with its center of cavity below the pivot point 20. The heating element 19 is a flat surface platen 21, on which a pot or other utensil 22 is located to receive the heat generated in the chamber. Heat is stored in phase change material 23 which melts at about 180° C. to 200° C. and provides heat to the chamber after sundown to maintain its temperature for many hours. Sun energy is focused through an orifice 41 to a sealed first cavity 18 within the chamber 14.

The first cavity 18 is sealed from the second cavity 17 by a separator plate 33. Sun energy heats the walls of the cavity 18 and a separator plate 33, which reradiates the sun energy into the chamber 17. The heat energy heats the chamber 17 to the melting point of the phase change material 23 which absorbs heat energy as a latent heat required to melt the phase change material. The molten material 23 may tend to expand as it changes phase. To accommodate this expansion, an air chamber 34 is provided above the phase change material 23. The platen 21 is cast with the ribs 35, which dip into the phase change material 23, and provide a conduction path for the heat to pass from the phase change material 23 to the platen 21 on which for example, a cooking vessel 22 is placed. In this manner a good heat conduction path is provided between the phase change material 23 and the platen 21. An air space 34 is located above the phase change material 23 to accommodate its expansion or contraction as it changes state. The Fresnel surface 31 is maintained normal to the sun at all times by a small clock motor 9'. The clock motor 9' may be electrically, spring or gravity-weight driven. It is mounted on the bracket 8 attached to the member 4. The member 4 is adjusted for the latitude angle $\theta$; for example, by the turn buckle 5; an adjustment being made once for each geographic location. A further adjustment through the angle $\phi$ is made for the seasonal variation of the sun's position. The angle $\phi$ is adjusted by turn buckle 36 connected between the support frame 37 on the Fresnel lens 31, and the chamber surface 34 by brackets 38 and 39 respectively. The frame support for Fresnel lens 31 has a shape of a truncated pyramid inverted with its base up and its apex near the focal point of the Fresnel lens. The Fresnel lens support structure is attached to a spherical member 40, which may be a portion of a sphere having an internal aperture 41 to provide a passage for the sun's rays. The rotatable member 40 is mounted in an aperture on the side of the cylindrical chamber 14. The Fresnel lens and the chamber is counter weighted by a counter weight 42 to balance the assembly. The chamber and the lens structure may then be rotated through the angle $\Omega$, measured from the YY' horizontal axis shown in FIG. 2, proportional to the time of the day with relatively little power by the clock motor 9'; for example, about 5 watts.

Figure 2:
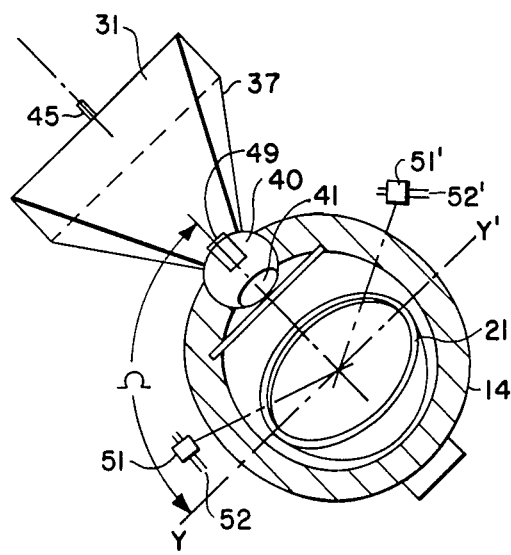
FIG. 2 is a view normal to the axis of the rotatable heating chamber.

The FIG. 2 shows a view normal to the axial member 4. The Fresnel lens 31 is supported on the mounting frame 37 which is attached to a spherical member 40 which has an internal aperture 41. The top of the platen 21 is also shown in this view.

Phase change materials may be selected from certain solids which melt in the range of 150° C. to 250° C. Certain organic substances may be employed; for example, Hydroquinone (also known as Quinol) a melting point of 172° C. and latent heat of $2.46 \times 10^5$ joules/Kg; or, ortho-phthalic acid which has a melting point of 194° C. and latent heat $3.16 \times 10^5$ joules/Kg. Other phase change materials may be used; for example, a metal such as tin which melts at 232° C., and has a latent heat $0.59 \times 10^5$ joules/Kg. In a chamber 50 centimeters in diameter, with a wall insulation thickness of 10 centimeters, a 8 Kg of a phase change material such as Quinol may be employed to maintain a temperature of about 180° C. for about four hours after sundown in the chamber 17 and the plante 21. If necessary an additional quantity of phase change material may be employed and distributed around the walls of the chamber. To increase the heat retention time so as to maintain the temperature until sunup, about 20 Kg of phase change material may be required, the amount required being dependent on the insulation effectiveness.

The mechanism for rotating the chamber to the starting position at sunrise: For example, there may be a manual ratchet override to suitably position the Fresnel lens. A rod similar to a sun dial may be mounted to the surface of the Fresnel lens to enable the adjustment of the angular position of the Fresnel lens surface normal to the sun's rays. The latitude angle $\theta$, seasonal angle $\phi$, and rotation angle $\Omega$ may be adjusted independently to adjust the Fresnel lens surface. The rod 45 attached to the Fresnel lens indicates that the surface of the Fresnel lens is normal to the sun's rays by projecting no shadow.

It will be understood that the solar cavity device herein disclosed has many uses other than as a cooking stove; for example, it may be used as an efficient heat source to provide steam for conversion to electric power, for heat transmission via heat pipes or for other heating purposes well known to the art.

Various means may be employed to accurately position the focus spot of the sun's rays, so that the spot is located within the aperture at all times. Bimetallic strips; or photo or thermo sensors, and electronic servo circuits well known in the art may also be employed for this purpose.

FIGS. 1 and 2 show a clutch 49 between the motor drive 9' and the rotatable chamber 14 which may be used to override the and manually position the axis of the Fresnel lens parallel to the sun.

Limit switches 51 and 51' disconnect, or reverse the motor to keep the angle 52 between limits. For example 20° to 160°.

A photosensor 55 may be employed to keep the axis of the Fresnel lens parallel to the suns rays. Signals are sent via 3 wire leads 56 to the servomotor 53 via leads 54 to position the Fresnel lens so that it focuses the suns energy through the cavity aperture 41 at all times.

A photocell 61 of about 20 cm×20 cm area provides sufficient power from the sun 60 (a few watts) to drive the motor 9' and position the chamber 14 as above noted. The photocell 61 diode 62 and storage battery 63 stores energy when the motor is drawing little or no power to turn the chambers 14.

This invention utilizes an efficient new concentrator and a cavity. While a Fresnel lens is employed in a preferred embodiment of this invention, it will be understood that other sun concentrating means such as a parabolic reflector may be employed instead. Various modifications of this invention may be made without departing from the scope of this invention.

What I wish to claim is:

1. A solar heating device comprising an insulating chamber, an aperture on said chamber, sunfollowing means for concentrating and focussing sunlight through said aperture into said chamber, a platen in said chamber, a heat-conductive ribbed element attached to a surface on said platen, a phase-change material, a container for said phase-change material, said platen being sealed to said container, said ribbed element dipping into said phase-change material, an air space above said phase-change material, said phase-change material melting at a temperature suitable for cooking food, whereby heat is provided to said platen to increase and maintain the said temperature of the said platen within the said chamber.

* * * * *